US00RE37436B1

(19) United States
(12) Reissued Patent
Santarossa

(10) Patent Number: US RE37,436 E
(45) Date of Reissued Patent: Nov. 6, 2001

(54) METHOD OF MANUFACTURING FOAM CORE MOLDINGS

(75) Inventor: Ned Santarossa, Concord (CA)

(73) Assignee: 888804 Ontario Limited (CA)

(21) Appl. No.: 09/406,061

(22) Filed: Sep. 27, 1999

Related U.S. Patent Documents

Reissue of:
(64) Patent No.: 5,672,391
Issued: Sep. 30, 1997
Appl. No.: 08/520,085
Filed: Aug. 28, 1995

(51) Int. Cl.[7] ..... B05D 3/12
(52) U.S. Cl. ..... 427/356; 427/403; 118/125; 264/171.13; 264/271.1; 264/275; 264/279; 264/299
(58) Field of Search ..... 427/356, 403; 118/125; 264/271.1, 275, 279, 171.13, 299

(56) References Cited

U.S. PATENT DOCUMENTS

| | | | | |
|---|---|---|---|---|
| 19,316 | | 2/1858 | Thayer et al. . | |
| 21,192 | | 8/1858 | Gardner . | |
| 23,426 | * | 3/1859 | Gardner | 118/125 |
| 90,658 | | 6/1869 | Garrison . | |
| 120,659 | | 11/1871 | Moore . | |
| 138,767 | | 5/1873 | Shepard . | |
| 658,427 | | 9/1900 | Cermak . | |
| 3,084,662 | * | 4/1963 | Badger | 118/50 |
| 3,428,024 | | 2/1969 | Oita et al. | 118/125 |
| 5,672,391 | | 9/1997 | Santarossa | 427/356 |

FOREIGN PATENT DOCUMENTS

| | | |
|---|---|---|
| 2804326 A1 | 8/1979 | (DE) . |
| 3932573 A1 | 4/1991 | (DE) . |

* cited by examiner

*Primary Examiner*—Katherine A. Bareford
(74) *Attorney, Agent, or Firm*—Mark Kusner

(57) ABSTRACT

A method of manufacturing an elongated decorative molding having a decorative surface and a desired cross-sectional profile is provided. A first coating material is applied to a molded core and then the molded core is passed through the opening of a first die. Once hardened, the coated profile is again coated with a second coating material and then passed through a second die.

8 Claims, 5 Drawing Sheets

METHOD OF MANUFACTURING FOAM CORE MOLDINGS

Matter enclosed in heavy brackets [ ] appears in the original patent but forms no part of this reissue specification; matter printed in italics indicates the additions made by reissue.

FIELD OF THE INVENTION

The present invention relates to decorative moldings of the type used in the construction industry to adorn walls and ceilings.

BACKGROUND OF THE INVENTION

Decorative moldings have been used for some time in the construction industry. The moldings used typically had a flat surface on one side and a decorative surface on the other. A visually appealing design, usually in three dimensions, is formed on the decorative surface of the molding, while the flat surface is configured to fit against the wall or ceiling. The molding is mounted to the wall such that the decorative surface is exposed to view, The molding is attached to the wall by applying an adhesive to the flat surface of the molding and then pressing the glued surface to the wall.

Traditionally, moldings have been made of plaster. Due to the relative weight and inflexibility of plaster, traditional moldings could not be used with all wall surfaces, especially on the exterior of a building. Wooden moldings have become popular for some applications due to their relative flexibility and lightness. The cost of wooden moldings can be high, and wooden moldings tend to deteriorate if exposed to the elements.

Recently, exterior moldings have been made of foam. The foam moldings are often composed of an expanded polymer such as polystyrene or polyurethane. The foam molding may be used as is, but in most cases the decorative surface of the molding is covered with mesh and then a coating of either plaster or cement. The coating is applied by hand by either spraying or trowelling. The coating is done after the foam molding is attached to the wall.

The application of the coating to the foam molding has been done by hand. This is a one consuming business and the quality of the finished product is not always consistent In some cases the finished decorative surface is sloppy or the coating is of uneven thickness. The unevenness of the coating may make the molding more rigid in some places than in others. The unevenness of the coating tends to make the coating crack and delaminate over time.

SUMMARY OF THE INVENTION

The invention is a method of manufacturing an elongated decorative molding having a decorative surface and a desired cross-sectional profile, comprising the steps of applying a first coating material to a moulded core and then passing the moulded core through the opening of a first die. Once hardened, the coated profile is again coated with a second coating material and then passed through a second die.

The moulded core has a flat surface on one side, a decorative surface on another side and a cross sectional profile. The cross sectional profile of the moulded core is proportionally smaller than the desired cross sectional profile of the finished decorative molding. The coating material is applied to the decorative surface of the core and the profile of the die opening is proportionally larger than the cross-sectional profile of the core such that the decorative surface of the core is spaced from the die as it passes through the die opening.

The invention also comprises a device for coating a molding core comprising a coating means for applying the coating material to the molding core, a die for removing the excess coating material from the molding core and a feeding means for pushing the molding core through the coating means and through the die.

DESCRIPTION OF THE PREFERRED EMBODIMENT

Figure 1:
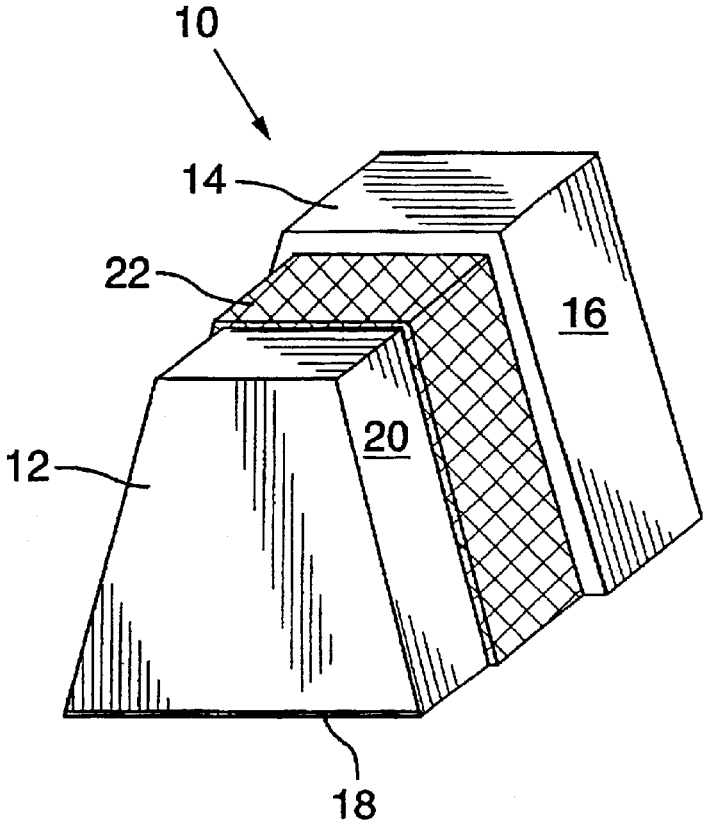
FIG. 1 is a perspective view of a finished decorative molding made by the method of the invention.
Figure 2:
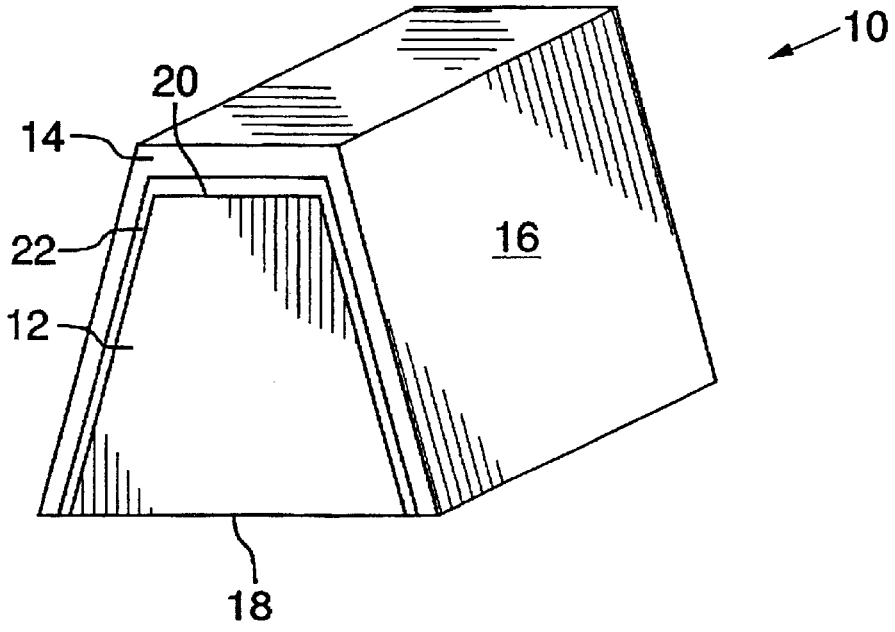
FIG. 2 is a cross sectional view of the molding shown in FIG. 1.

Referring to FIGS. 1 and 2, an extruded decorative molding according to the present invention is shown generally as item 10 and comprises a molding core 12 having a coating 14. Molding 10 has a decorative surface 16 and a flat surface 18. Molding core 12 has a shaped surface 20 and flat surface 18. Between molding core 12 and coating 14 is mesh 22, which is adhered onto shaped surface 20 of the molding core. Molding core 12 can be made of a variety of light weight materials including wood and plastic. Preferably, molding core 12 is made of an expanded or foamed plastic such as polystyrene or polyurethane. The material forming coating 14 can be plaster, cement or some other material commonly used to make decorative moldings. Mesh 22 is a net like material that helps to bind coating 14 onto molding core 12. Molding core 12 is preferably either an elongated extrusion or cut foam.

Molding 10 has a cross sectional profile that is selected such that the molding will be visually appealing when mounted to a wall or ceiling. Flat surface 18 of the molding allows the molding to be muted to the wall while decorative surface 16 of molding 10 is exposed for view. To mount molding 10 to a wall, an adhesive is placed on flat surface 18 and the surface is pressed to the wall. The visual appeal of decorative surface 16 is governed by the cross sectional profile of the molding. Generally, decorative surface 16 is substantially convex, but concave surfaces may also be selected.

The method of the present invention comprises the steps of applying a first coating material to a molding core 12, passing the coated molding core through the opening of a first die, hardening the coating material, applying a second coating material to the coated molding core, then passing the twice coated molding core through a second die. Molding core 12 is provided with a substantially flat surface 18 and a shaped surface 20 and has a cross sectional profile approximately the same shape as the desired cross sectional profile of the finished molding. The cross sectional diameter of molding core 12 is selected to be approximately 1 cm less than the desired cross sectional diameter of the finished molding. Preferably, a mesh 22 is adhered to shaped surface 20 of molding core 12 before the molding core is coated. Mesh helps the first coating material to adhere to the surface of molding core 12.

The first and second coating materials are preferably either a plaster or cement, depending on the desired finished product. The first coating material should be more granular than the second coating material. It has been discovered that a relatively granular coating material adheres better to the surface of molding core 12; however, too granular a coating yields a finished product having too rough a surface. To overcome this problem, the second coating material should have a finer grain size to ensure a finished molding with a smooth surface. It has been discovered that a cement made from a coarse grit sand forms an excellent first coating material and a cement made from a finer 200 grit sand forms an excellent second coating material.

The dies have an opening with a profile substantially similar to that of the cross sectional profile of molding core 12. The diameter of the opening is slightly greater than the diameter of the cross sectional profile such that the edges of the die opening are spaced between ⅛ to ¼ inches away from the surface of molding 12. The opening of the first die is slightly smaller than the opening of the second die.

Figure 7:
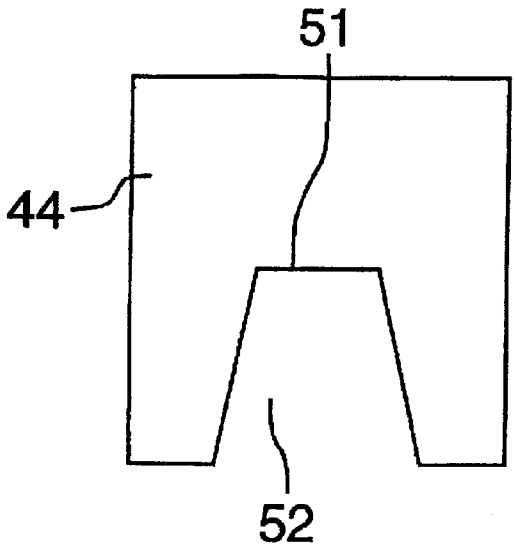
FIG. 7 is a front view of the die portion of the device of FIG. 3.
Figure 8:
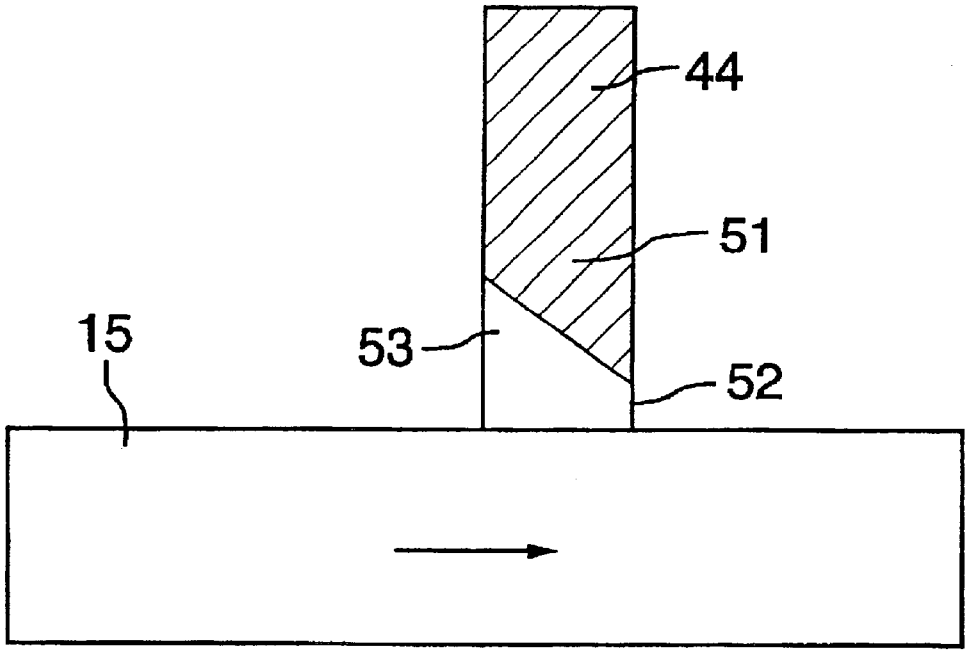
FIG. 8 is a schematic side view, partly cross section, of a portion of the device shown in FIG. 5.

Referring to FIGS. 7 and 8, the dies preferably comprise a flat plate 44 having a thickness of between ½ to 2½ inches. The edges 51 of the die opening are bevelled, preferably at a 45° angle so that each die has a slightly larger opening or mouth 53 on one side of the die. The coated molding 15, is inserted through mouth 53 of the die. Edges 51 of the die spreads the coating material and removes any excess material.

The coating of the material onto molding core 12 can be accomplished by passing the molding core through a chamber having a quantity of coating material. The coating material can then be coated onto the molding core by pouring or even spraying as the molding care passes through the chamber.

After the molding core is coated with the first coating material it is left to harden. The time necessary to harden the first coating depends on the thickness of the first coating and the coating material use. The first coating should be sufficiently hardened such that the second coat can be applied without the first coating falling off during the coating process. If cement is used, hardening times of between four hours and 24 hours will generally be required for the first coating. After the first coating is sufficiently hardened, the coated molding core is then coated with the second coating. The twice coated molding core is then passed through the second die to remove the excess coating material and to impart the final smooth finish.

An alternate embodiment of the method comprises the steps of coating molding core 12 with a coating mixture, passing the coated molding core through the opening of a first die, then passing me molding though the opening of a second die. The opening of the first die has a profile larger than the cross sectional profile of the molding core. The opening of the second die has a diameter greater than the cross sectional diameter of the molding core and slightly smaller than the diameter of the first die's opening. The diameter of the first die's opening is selected such that the edges of the first die adjacent the opening are spaced between ⅙ and ⅛ inches from the molding core. The diameter of the opening of the second die is selected such that the edges of the second die adjacent the opening are spaced between 1/32 and 1/16 inches from the molding core. The profile of the opening of the second die is equivalent to the desired cross sectional profile of the finished molding.

In both methods of producing the coated molding the flat surface of the molding is covered so that it is not coated with the coating material. This creates a finished product having a coated decorative surface, and a non-coated flat surface.

Figure 3:
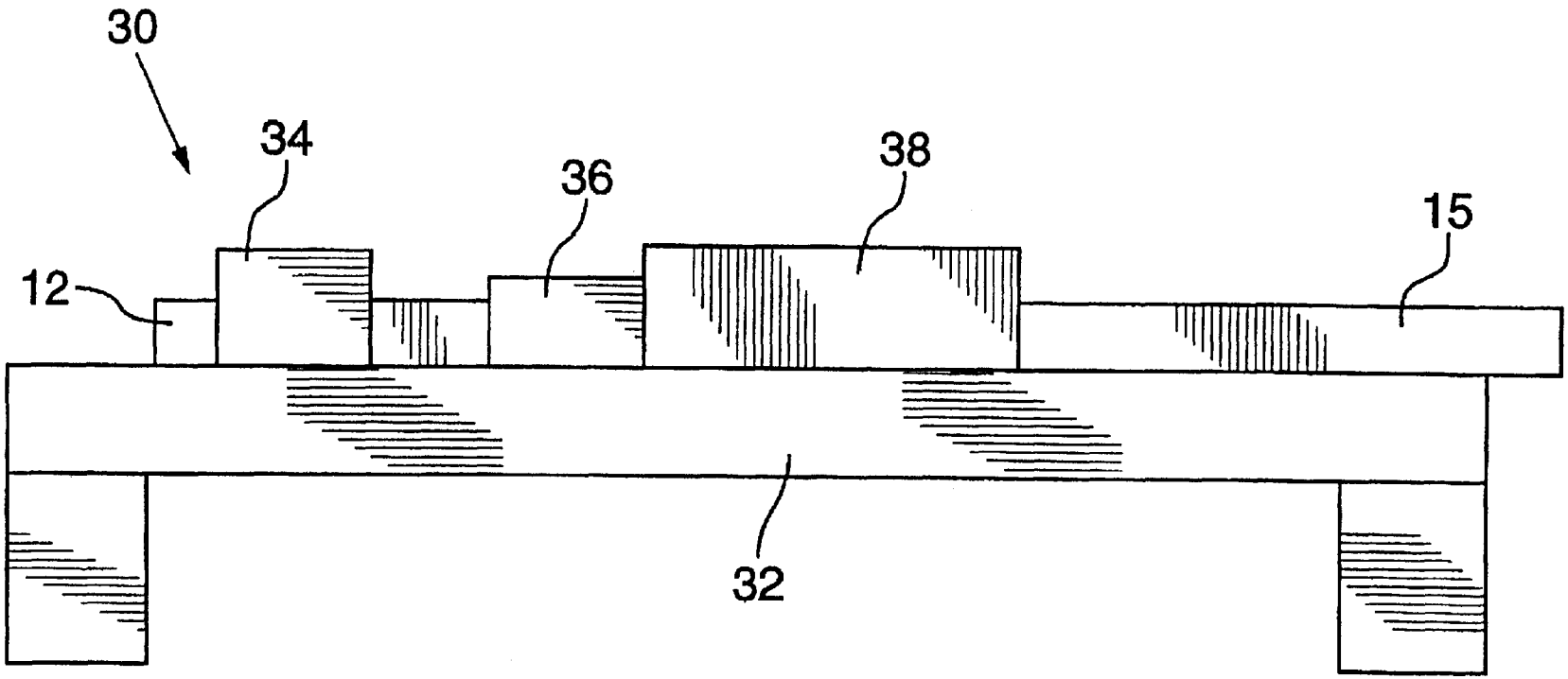
FIG. 3 is a side view of the apparatus of the present invention.
Figure 4:
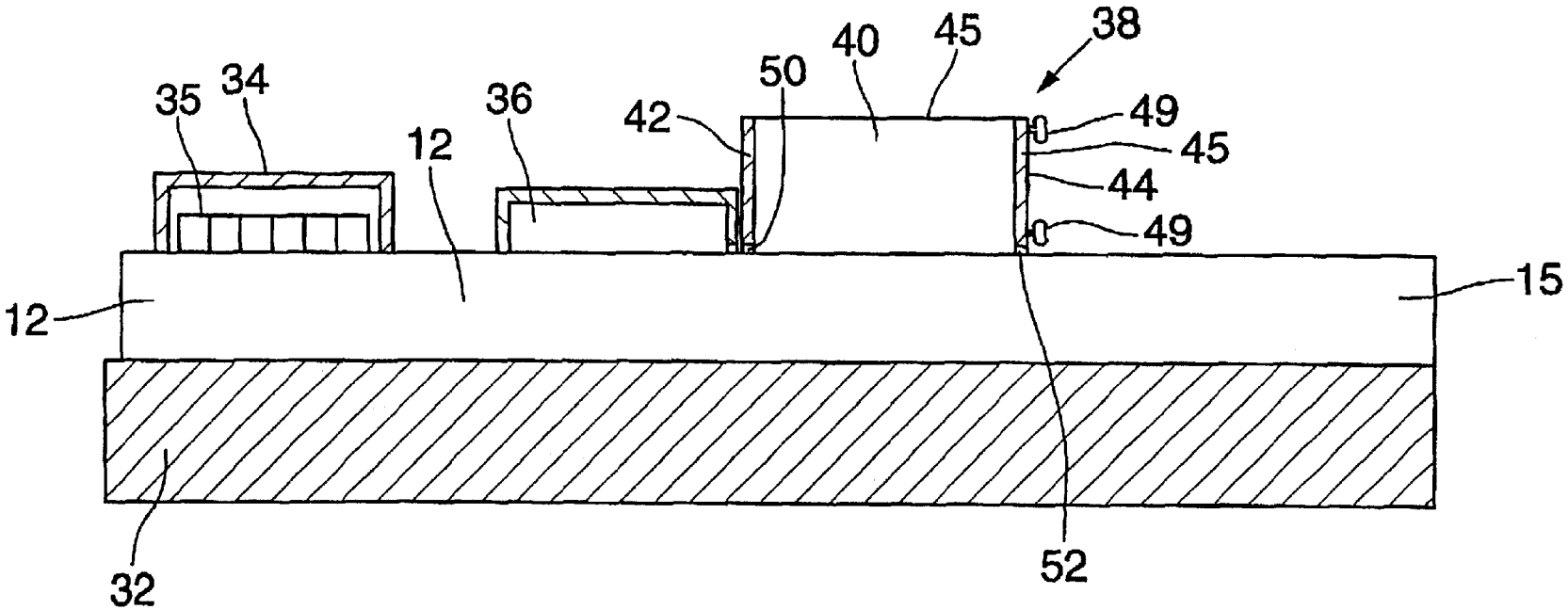
FIG. 4 is a partial long sectional view of the apparatus of FIG. 3.

Referring to FIGS. 3 and 4, a coating machine that carries out the method of the present invention is shown generally as item 30 and consists of a table 32, feeder mechanism 34, alignor 36, and coating chamber 38. Molding core 12 is placed onto the top of table 32 and one end of the molding core is inserted into feeder mechanism 34. The flat surface of molding core 12 is in contact with the top surface of table 32. The top surface of table 32 is preferably smooth and flat to permit molding core 12 to slide easily along. Feeder mechanism 34 drives molding core 12 through alignor 36. Alignor 36 guides molding core 12 into coating chamber 38. Coating chamber 38 coats molding core 12 with coating material as it passes there through. Feeder mechanism 34 preferably comprises a pair of conveyor belts 35 (see FIG. 5) that are positioned to hold onto molding core 12 between them. As conveyor belts 35 turn, molding core 12 is pulled through feeder mechanism 34. The top surface of table 32 is preferably made of a low friction material such as teflon to reduce the amount of friction between the flat surface of molding core 12 and the top of table 32. Feeder mechanism 34 pushes the molding core past coating chamber 38 and the coated molding core 15 is passed to a drying table (not shown) where the coating material hardens. The particular parts of coating machine 30 shall now be discussed.

Figure 5:
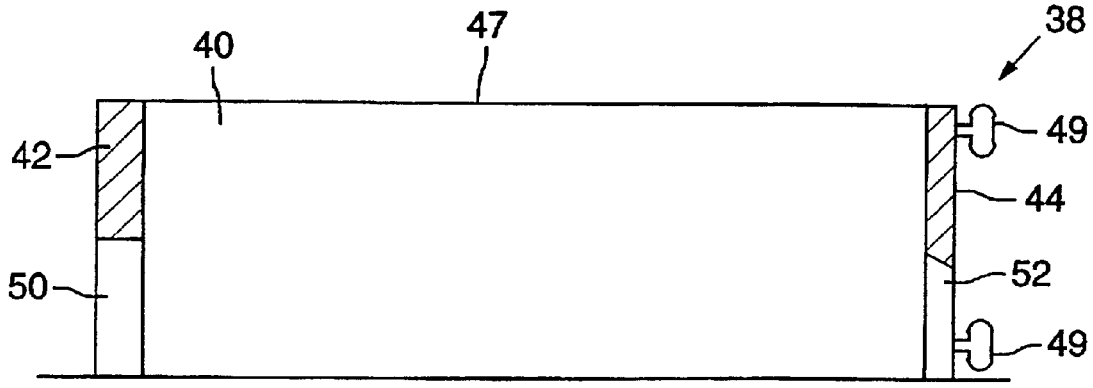
FIG. 5 is a long sectional view of the coating device of the apparatus of FIG. 3.

Referring to FIGS. 4 and 5, coating chamber 38 comprises coating compartment 40 having a front wall 42, back wall 44 and open top 47. Front wall 42 is provided with opening 50, which is dimensioned to permit molding core 12 to pass therethrough. Back wall 44 is provided with a bevelled opening 52, dimensioned to have a profile proportionally larger than the profile of molding core 12. As molding core 12 enters compartment 40, the coating material is applied through open top 47.

A variety of methods of applying the coating material to the surface of the molding can be used including spraying or pouring. Preferably, the coating material is poured directly overtop of molding core 12 as it passes through compartment 40. Alternatively, compartment 40 may contain a sufficient volume of coating material such that molding core 12 is coated as it passes through the compartment. The volume of coating material is continuously replenished from top opening 47. An operator positioned above opening 47 may assist the coating step by trowelling the coating material over the molding core as it passes through compartment 40.

The coating material is preferably wet plaster or cement, the viscosity of which is selected to permit the material to evenly coat the exposed surfaces of molding core 12. Flat surface 18 is not coated with the coating material because it is protected by the top surface of table 32.

Referring to FIGS. 4 and 5, the portion of back wall 44 adjacent opening 52 forms a die 45. As the coated molding core passes through opening 52, the portion of back wall 44 adjacent opening 52 removes excess coating material from the molding core. Opening 52 has a profile similar to, but proportionally smaller than, the desired profile of the finished molding 10. Opening 52 imparts a cross-sectional profile onto the coated molding core proportionally smaller on the desired cross-sectional profile of the finished molding.

Back wall 44 is attached to coating chamber 38 by attachment means 49, which preferably comprises removable screws. Back wall 44 am be removed and replaced by another die by removing attachment means 49. In this way, coating chamber 38 can be adapted for each particular desired molding by simply replacing back wall 44 with the required die.

After molding core 12 passes completely through coating chamber 38, it is carried to a drying table (not shown) and the coating is allowed to harden. After the first coating is hardened, coated molding core 15 is ready for the application of the second coating material. Before coated molding 15 is again passed through device 30, back wall 44 of coating chamber 38 is replaced with another die having a larger opening. Preferably, the profile of the opening of the replacement die is equivalent to the cross sectional profile of the finished molding. Coated molding 15 is passed through device 30 and a second coating is applied. The first coating should be sufficiently hard so that it will not crack or break during the second coating process. The distance between conveyer belts 35 in feeder mechanism 34 may have to be adjusted for the greater diameter of the coated molding core 15. The second coating step is identical to the first coating step, the only difference being the second coating material.

Feeding mechanism 34 passes molding 10 past coating chamber 38, preferably to a drying table (not down) down stream of the coating device. Molding 10 is allowed to dry sufficiently such that the coating is fully dried. A drying chamber (not shown) may be added down stream of coating chamber 38 to speed up be drying process. After molding 10 has dried and cured, the molding is ready for use.

Back wall 44 of coating chamber 38 preferably comprises one of two dies. If molding core 12 is to be coated with a first coating material, then wall 44 preferably comprises a die having an opening proportionally larger than the cross sectional profile of the molding core. The opening of the die will also be proportionally smaller then the cross sectional profile of the desired finished molding core. If the molding core is being coated with the second coating material, then wall 44 preferably comprises a die having an opening with a profile identical to the desired cross sectional profile of the finished molding. FIG. 7 illustrates a die suitable for use.

Referring to FIGS. 7 and 8, opening 52 is surrounded by edge 51 of back wall 44. Edge 51 of back wall 44 is preferably bevelled and has a mouth 53, immediately in front of and slightly larger than opening 51 it has been discovered that the bevelled edge 51 surrounding opening 52 permits a smoother application of the coating material. The exact thickness of the coating is controlled by the dimensions of the openings of the dies. If a coating thickness of ½ inch is desired, then opening 52 should be dimensioned such that back wall 44 is spaced ½ inch away from coated molding core 15 as the coated molding core passes through the die. The smoothness of the surface of molding 10 is controlled by the viscosity of the coating material and the bevel of the dies. If insufficient moisture is present in the cement mixture, then the finished surface of molding 10 will be rough. It is a trivial task to regulate the moisture content of the cement mixture to reach the desired viscosity.

Figure 6:
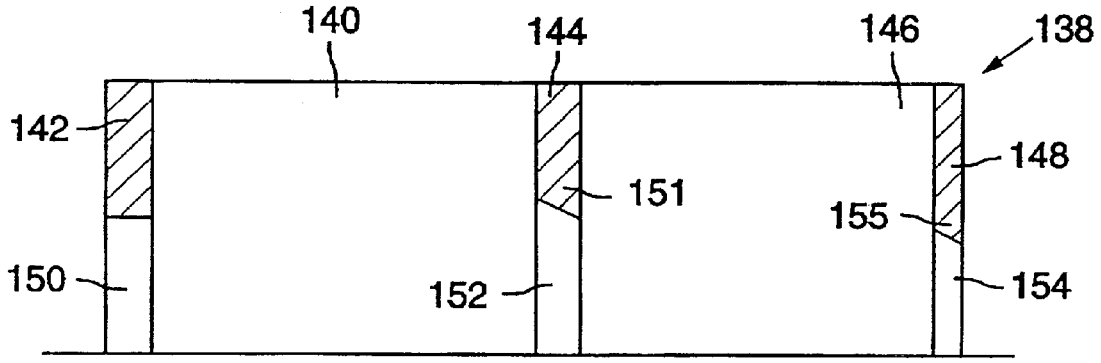
FIG. 6 is a long sectional view of an alternate embodiment of the coating device of the apparatus of FIG. 3.

Coating machine 30 can be modified to carry out the alternate coating method. Simply replacing coating chamber 38 with a two chambered coating device permits the two step coating method to be used in just one pass of the molding core. Referring to FIG. 6, an alternate coating device that carries out the alternate method of the present invention is shown generally as item 138. Coating device 138 comprises coating compartment 140 having a front wall 142, a back wall 144 and sizing compartment 146 having a back wall 148. Front wall 142 is provided with opening 150, which is dimensioned to permit molding core 12 to pass therethrough. Back wall 144 is provided with in opening 152, dimensioned to have a profile proportionally larger than the profile of molding core 12. Edge 151 of back wall 144 adjacent opening 152 is bevelled. As molding core 12 enters compartment 140, the coating material is applied. As the coated molding core passes through opening 152, bevelled edge 151 of back wall 144 adjacent opening 152 removes excess coating material from the molding core. Opening 152 has a profile similar to, but proportionally larger than, the desired profile of the finished molding 10. Opening 152 imparts a cross-sectional profile onto the coated molding core proportionally larger than the desired cross-sectional profile of the finished molding.

After passing through opening 152, the coated molding core passes through the sizing chamber 146. The coated molding core then passes through opening 154 and out of chamber 146. Opening 154 has the same profile as the desired cross-sectional profile of the finished molding 10. Bevelled edge 155 of wall 148 is adjacent opening 154 and imparts the desired cross-sectional profile to the finished molding 10. Preferably, opening 154 has a cross sectional profile proportional to but slightly smaller the to profile of opening 152. Preferably, opening 152 is ¼ inch larger than opening 154. Bevelled edge 155 scrapes the excess coating material as the molding passes opening 154. The excess coating material removed in chamber 146 may be passed to chamber 140 where it can be reused. It has been discovered that the use of two bevelled dies, the first die being slightly larger than the second, imparts a superior finish to the product.

The exact thickness of the coating is controlled by the dimensions of opening 154. If a coating thickness of ½ inch is desired, then opening 154 should be dimensioned such that die 148 is spaced ½ inch away from molding core 12 as the molding core passes through the die. The smoothness of the surface of molding 10 is controlled by the relative sizes of openings 152 and 154, the bevelled nature of the die openings and the viscosity of the coating material.

Molding cores of various lengths am be used in this invention. Molding core 12 may even have a different cross sectional profile than finished molding It. Preferably, molding core 12 has a profile identical to, but proportionally smaller than, the desired cross-sectional profile. If the coating is thick enough; however, a different cross-sectional profile may be imparted on to the finished molding. If the cross sectional profiles of the finished molding 10 is not proportionally the same as the cross sectional profile of molding core 12, then the thickness of the coating will be uneven. It has been discovered that even coating thickness is desirable.

It is therefore to be understood that various other modifications and changes may be made in the construction and arrangement of parts comprising the preferred form of invention as described without departing from the spirit and scope of the invention as defined by the appended claims and reasonable equivalents thereof.

I claim:

1. A method of manufacturing an elongate decorative molding having a decorative surface, comprising the steps of:

(a) placing a flat surface of an elongate foam molding core on an input portion of a flat elongate table, the foam core comprising a flexible resilient expanded polymer foam solid having: said flat surface on one side; a decorative surface on another side and a cross[-] sectional profile, the cross sectional profile of the core being proportionally smaller than the desired cross sectional profile of the finished decorative molding, the table including a smooth continuous planer top surface and a longitudinal axis;

(b) aligning the foam core on said longitudinal axis of the table;

(c) sliding the foam core on the top surface of the table [forwardly] along the axis through a coating containment chamber, the coating chamber: having a bottom surface defined by the top surface of the table; having [a rearward] *an* opening larger than the core profile; side walls and a [forward] wall which includes a die, the die having a die opening with a profile proportionally larger than the cross sectional profile of the molding core, the die opening having a profile conforming a desired cross sectional profile;

(d) applying a cementatious liquid coating material to the decorative surface of the molding core as the foam core slides through the coating chamber, the flat surface of the core slidingly engaging the top surface of the table thus being shielded from coating material;

(e) passing the coated molding core through the die opening on to an output portion of the table top surface; and (f) curing the coating material after the molding has passed the die.

2. A method according to claim 1, wherein, the die opening is beveled [expanding rearwardly, the opening in a rearward side of the die being proportionally larger than the opening in a forward side of the die] *wherein the die opening is proportionally smaller in the direction in which the core is passed.*

3. A method according to claim 1 wherein, the die is a removable plate.

4. A method according to claim 1 wherein, the coating chamber has an open top.

5. A method according to claim 4 wherein, the step of applying the cementatious coating includes trowelling the coating onto the decorative surface of the foam core.

6. A method according to claim 1 wherein, prior to the step of placing the core on the table, the method includes the step of securing a reinforcing mesh to the decorative surface of the core.

7. A method according to claim 1 including the further steps of:

(g) sliding the first coated foam core on the top surface of the table [forwardly] along the axis through a second coating containment chamber, the second coating chamber[:] having: a bottom surface defined by the top surface of the table; [having a rearward] *an* opening larger than the first coated core profile; side walls and a [forward] wall which includes a second die, the second die having a second die opening with a profile proportionally larger than the cross sectional profile of the first coated molding core, the second die opening having a profile conforming a desired cross sectional profile;

(h) applying a second cementatious liquid coating material to a cured first coated decorative surface of the molding core as the foam core slides through a second coating chamber, the flat surface of the core slidingly engaging the tip surface of the table thus being shielded from the second coating material;

(i) passing the second coated molding core through a second die opening on to an output portion of the table top surface; and (j) curing the second coated material after the molding has passed the second die.

8. A method according to claim 1 including the further step of:

sliding the coated foam core on the top surface of the table [forwardly] along the axis through a drying chamber, the drying chamber: having a bottom surface defined by the top surface of the table.

* * * * *